United States Patent [19]
Caferro

[11] Patent Number: 5,958,326
[45] Date of Patent: Sep. 28, 1999

[54] PROCESS FOR PRODUCING A LIGHTING LOUVER

[76] Inventor: Ronald N. Caferro, 9919 E. Montgomery, Spokane, Wash. 99206

[21] Appl. No.: 08/927,121

[22] Filed: Sep. 5, 1997

[51] Int. Cl.⁶ .......................... B29C 51/10; B29D 11/00
[52] U.S. Cl. .......................... 264/550; 264/1.9; 264/2.7; 264/156; 264/163; 264/322; 264/554; 425/388; 425/808
[58] Field of Search .......................... 264/2.7, 322, 553, 264/554, 550, 571, 1.9, 132, 156, 163, 319, 320, DIG. 78; 425/388, 808

[56] References Cited

U.S. PATENT DOCUMENTS

| | | |
|---|---|---|
| 3,124,310 | 3/1964 | Lipscomb . |
| 4,330,500 | 5/1982 | Mackes ................................. 264/554 |
| 4,582,665 | 4/1986 | Jabarin ................................. 264/554 |
| 4,621,309 | 11/1986 | Grawe et al. . |
| 4,751,626 | 6/1988 | Plewman . |
| 5,431,862 | 7/1995 | Win ..................................... 264/2.7 |

*Primary Examiner*—Mathieu D. Vargot
*Attorney, Agent, or Firm*—Wells, St. John, Roberts, Gregory & Matkin P.S.

[57] ABSTRACT

A process is described for forming a lighting louver that includes a plurality of louver members. The process includes the steps of providing a sheet of thermoformable material and heating the sheet to a pliable state. A further step includes providing a forming mandrel having a series of mandrel partitions arranged with spaces between the partitions. The heated sheet is positioned over the forming mandrel, and is forced against the forming mandrel to form the heated sheet over the mandrel partitions and thereby produce a formed louver blank including formed louver segments that conform to the mandrel partitions and webbing segments that span the spaces between the partitions on the forming mandrel. In one preferred form the webbing segments are removed. In another preferred form, transparent webbing segments are formed that do not require removal and will transmit light. The webbing segments in the first form are removed from the louver blank to form light transmissive openings through the louver blank.

12 Claims, 12 Drawing Sheets

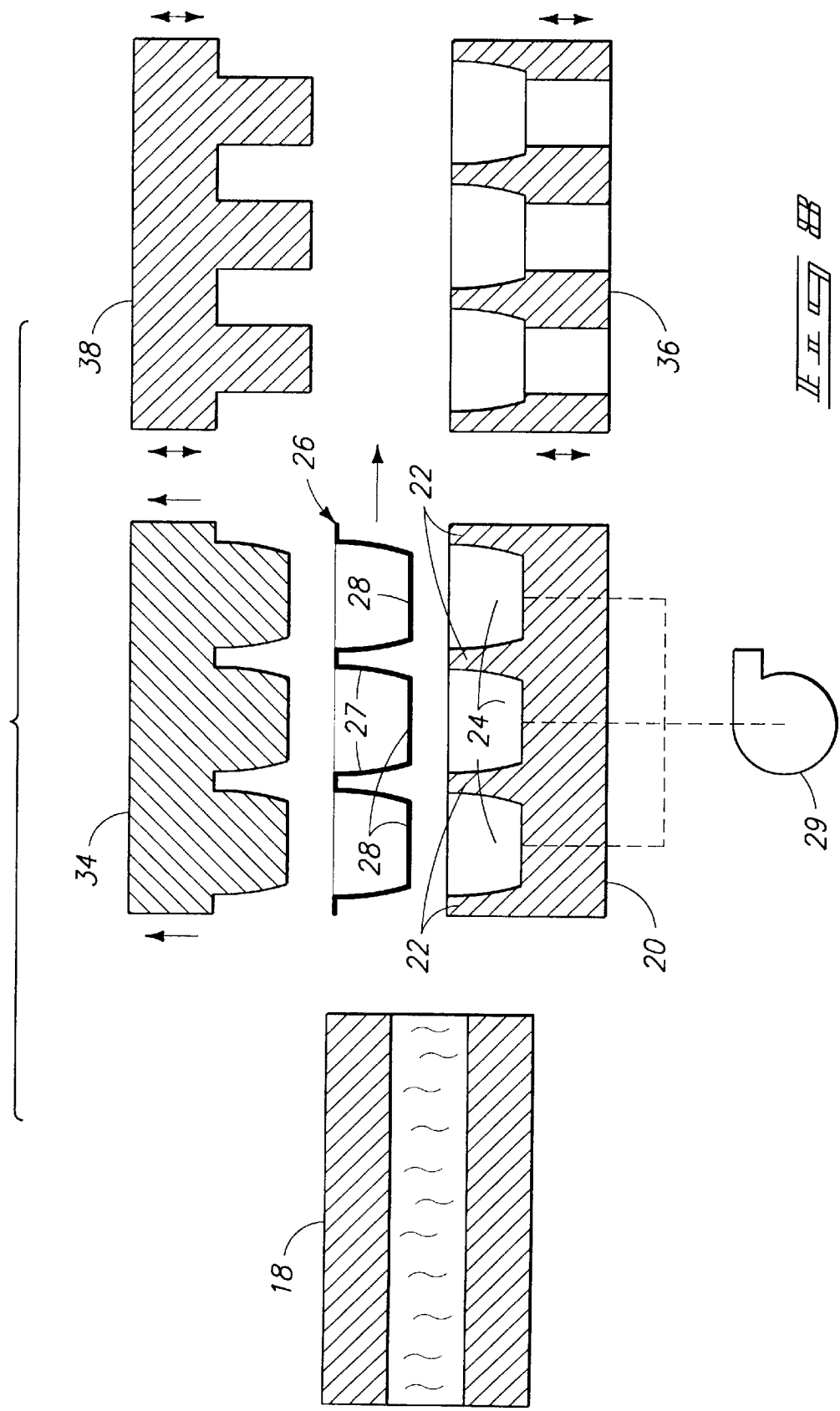

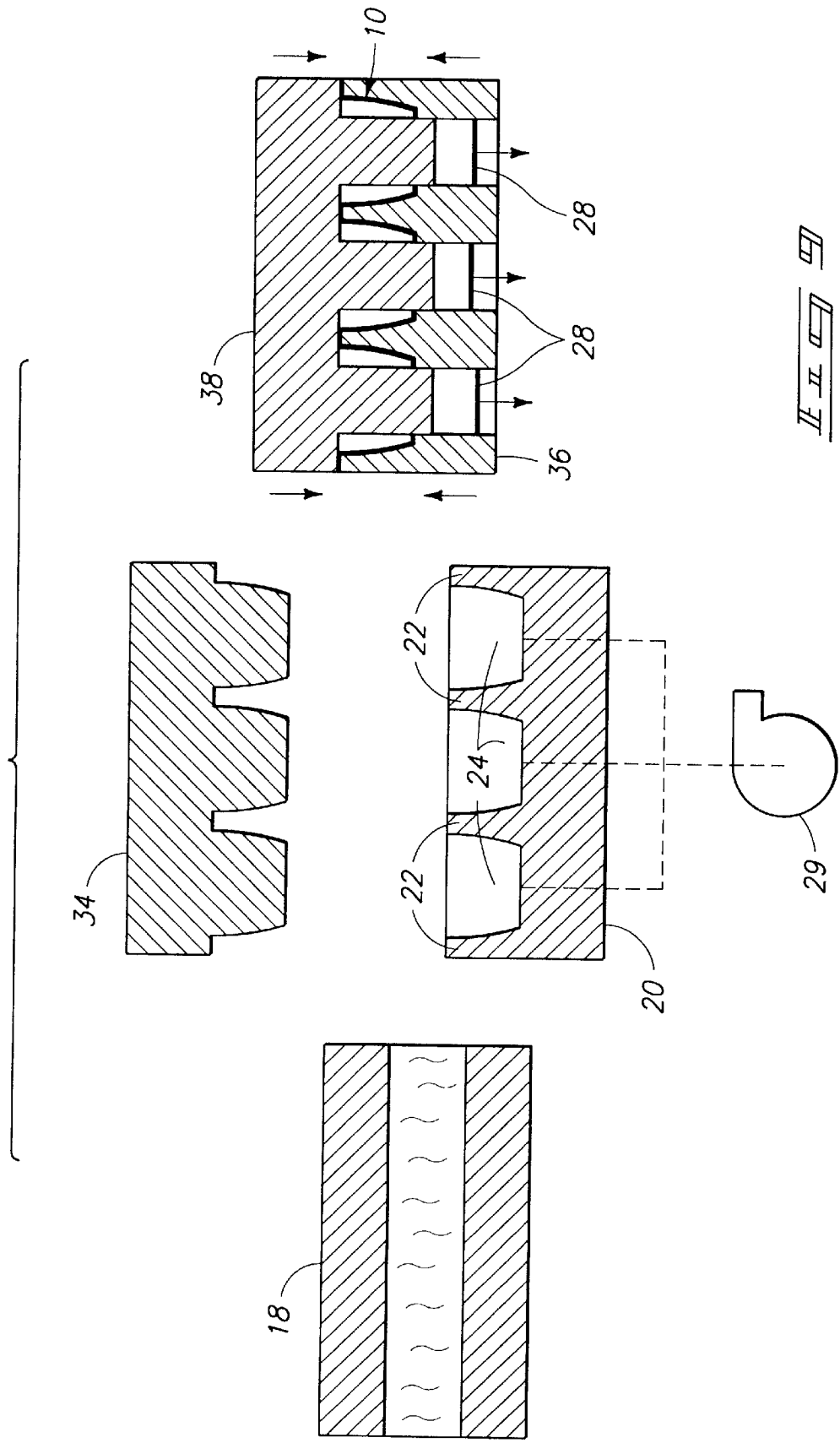

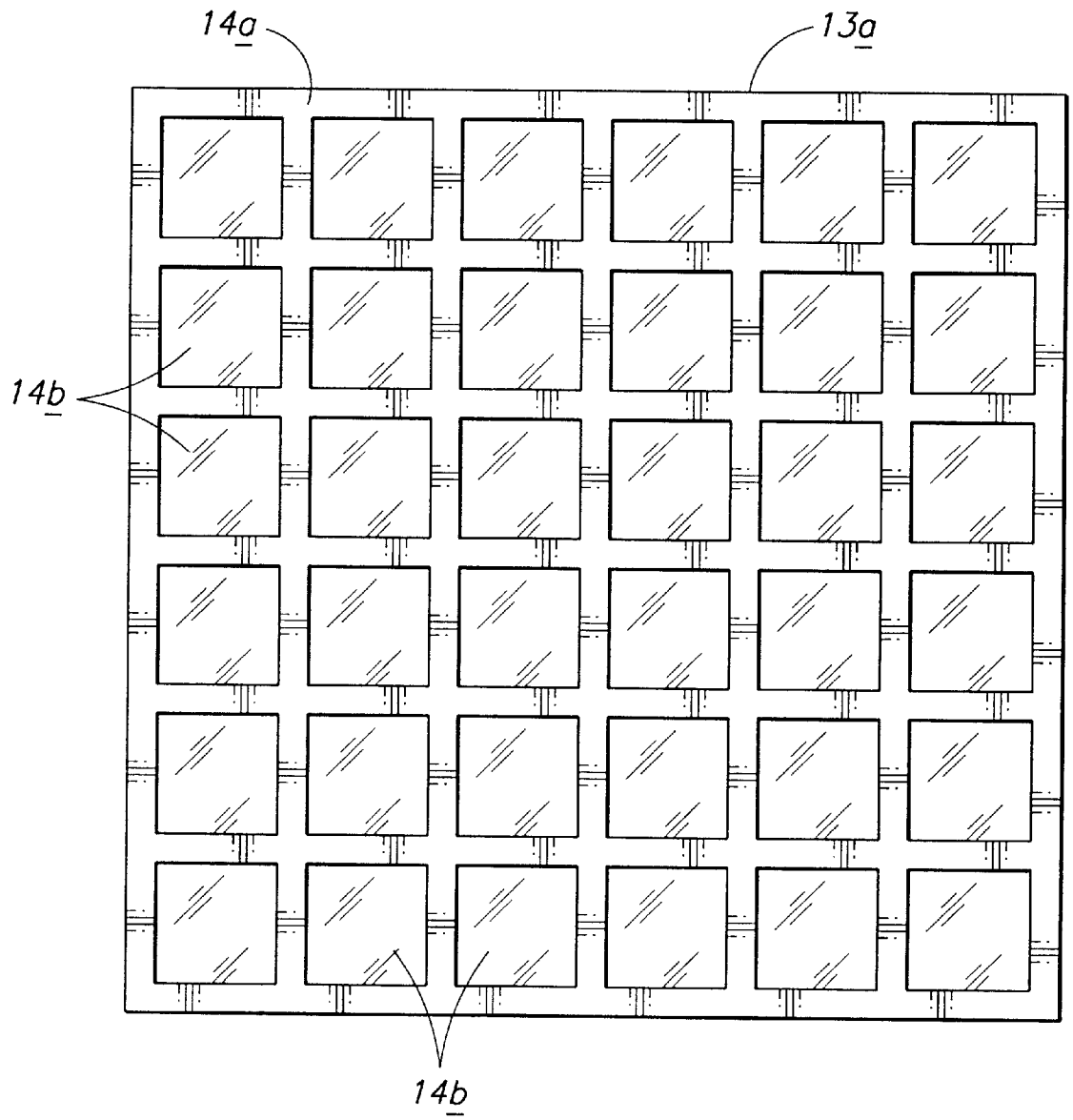

PROCESS FOR PRODUCING A LIGHTING LOUVER

TECHNICAL FIELD

The present invention relates to production of lighting louvers for illumination.

BACKGROUND OF THE INVENTION

Parabolic lighting louvers have been in use for a considerable time in overhead light fixtures for controlling light emission from incandescent and fluorescent lights. Louvers are used to reflect light through specific angles to reduce glare and evenly disperse light throughout a given area.

The typical light louver is constructed of light sheet metal, typically aluminum, that is shaped in parabolic curves and set into grid configurations. The sheet material must be processed through several expensive and time-consuming forming and assembly steps to produce each louver. Firstly, the sheet material is stamped or otherwise cut into specific shapes. Next the cut shapes are bent or otherwise formed into the desired parabolic configurations. Then the formed parabolic elements are swaged or otherwise connected together in a desired pattern before being placed in a frame.

Even with automated equipment, the process for forming lighting louvers is time consuming and expensive. A long-felt need has thus been realized for a system by which lighting louvers may be produced at a lower cost.

One approach to fill the above need has been development of plastic louvers made by injection molding. The louver configuration is cut into a plastic injection mold so the entire louver may be formed in one step by injecting molten plastic into the mold. This is an improvement in reducing the number of steps required for actual production of louvers, but has several drawbacks. Firstly, there is a constant need for various louver sizes. Production of a new mold for each new order of a different louver size is not economically feasible, especially for short run production. Material selection is limited to those plastics that lend themselves well to injection molding. Further, a plastic injection molded louver will not have an appropriately reflective surface and must be either plated or otherwise coated with a reflective material, thereby further increasing cost and increasing production time.

A need has therefore remained for lighting louver production that is low in cost, both for set-up and production. The present invention, as will be understood from the following description, fills this long-felt need and has for objectives, providing a louver forming process in which expensive molds are not required, and in which sheet material that has been previously coated with reflective material may be used, thereby eliminating the need to coat the finished louvers.

BRIEF DESCRIPTION OF THE DRAWINGS

Preferred embodiments of the invention are described below with reference to the following accompanying drawings, in which:

FIG. 7 is a schematic view showing a forming step wherein the heated sheet is formed over the forming mandrel;

FIG. 8 is a schematic view showing a step wherein the formed sheet is removed from the forming mandrel;

FIG. 9 is a schematic view showing a step wherein webbing segments between formed louver elements are die stamped from the formed sheet;

FIG. 12 is a flat plan view of a sheet used for forming the alternate louver shown in FIG. 11.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 2:
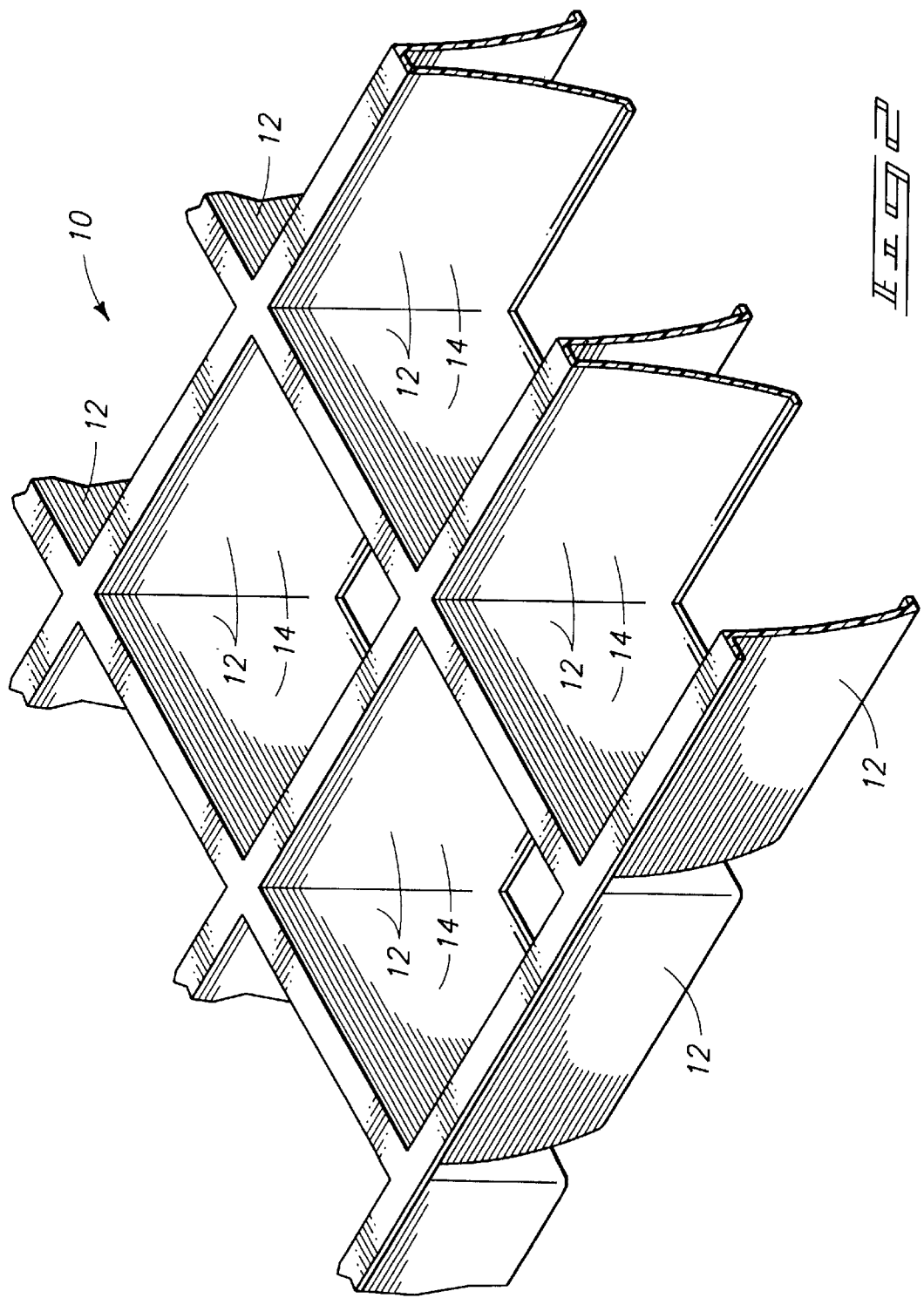
FIG. 2 is a fragmented perspective view of a completed louver formed by the present process.
Figure 3:
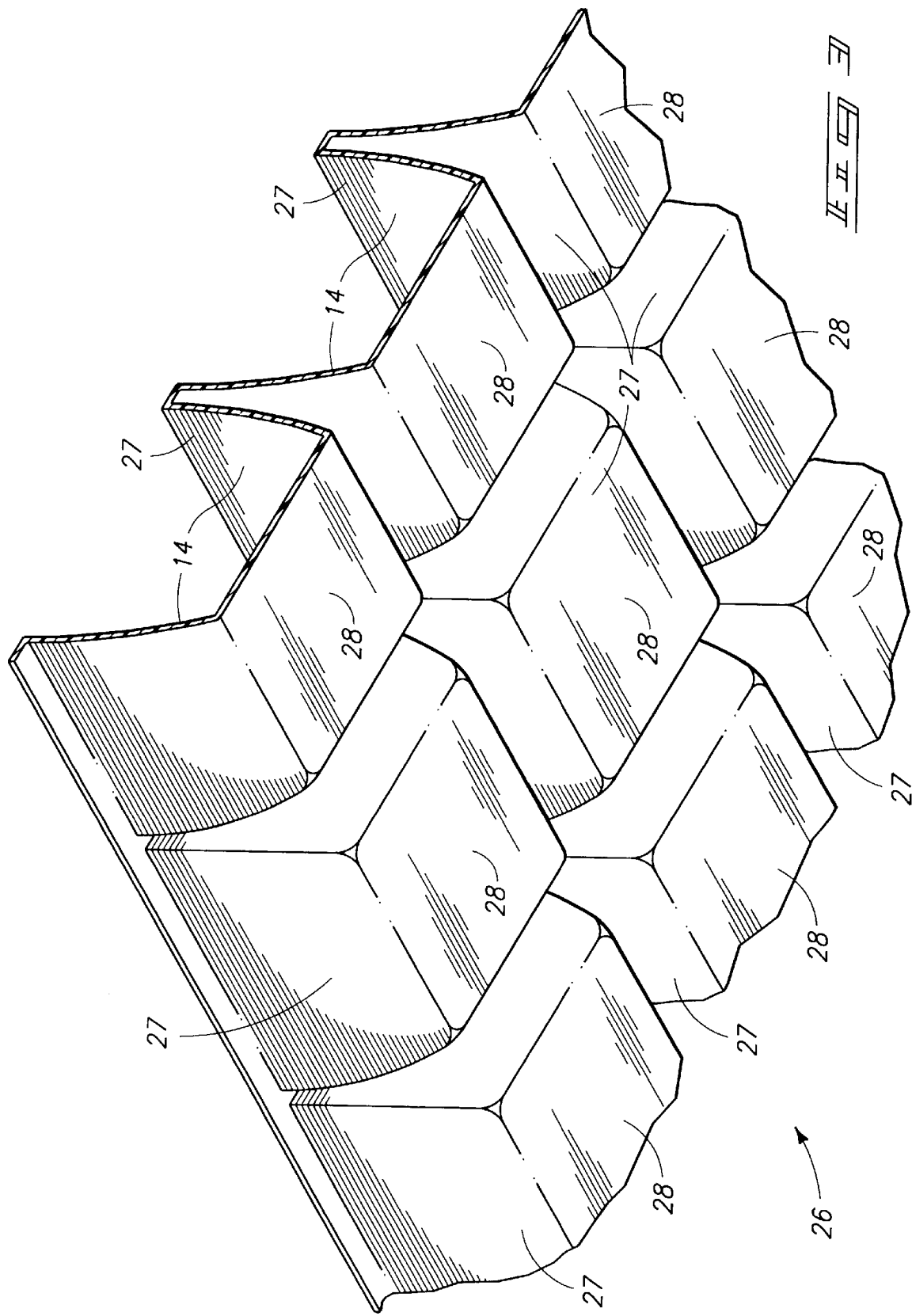
FIG. 3 is a fragmented perspective bottom view of the blank shown in FIG. 1.
Figure 4:
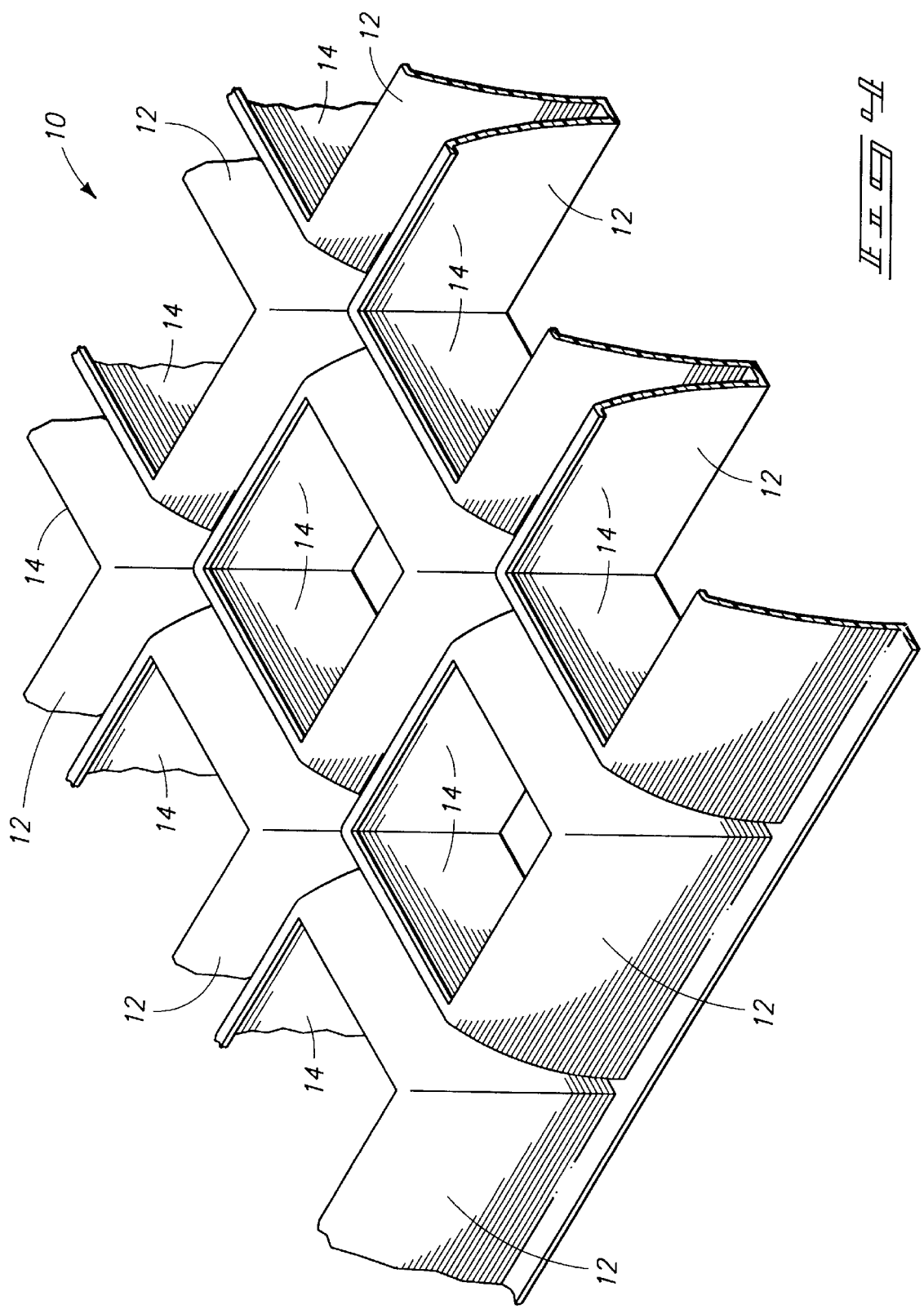
FIG. 4 is a fragmented perspective top view of the completed louver shown in FIG. 2.
Figure 11:
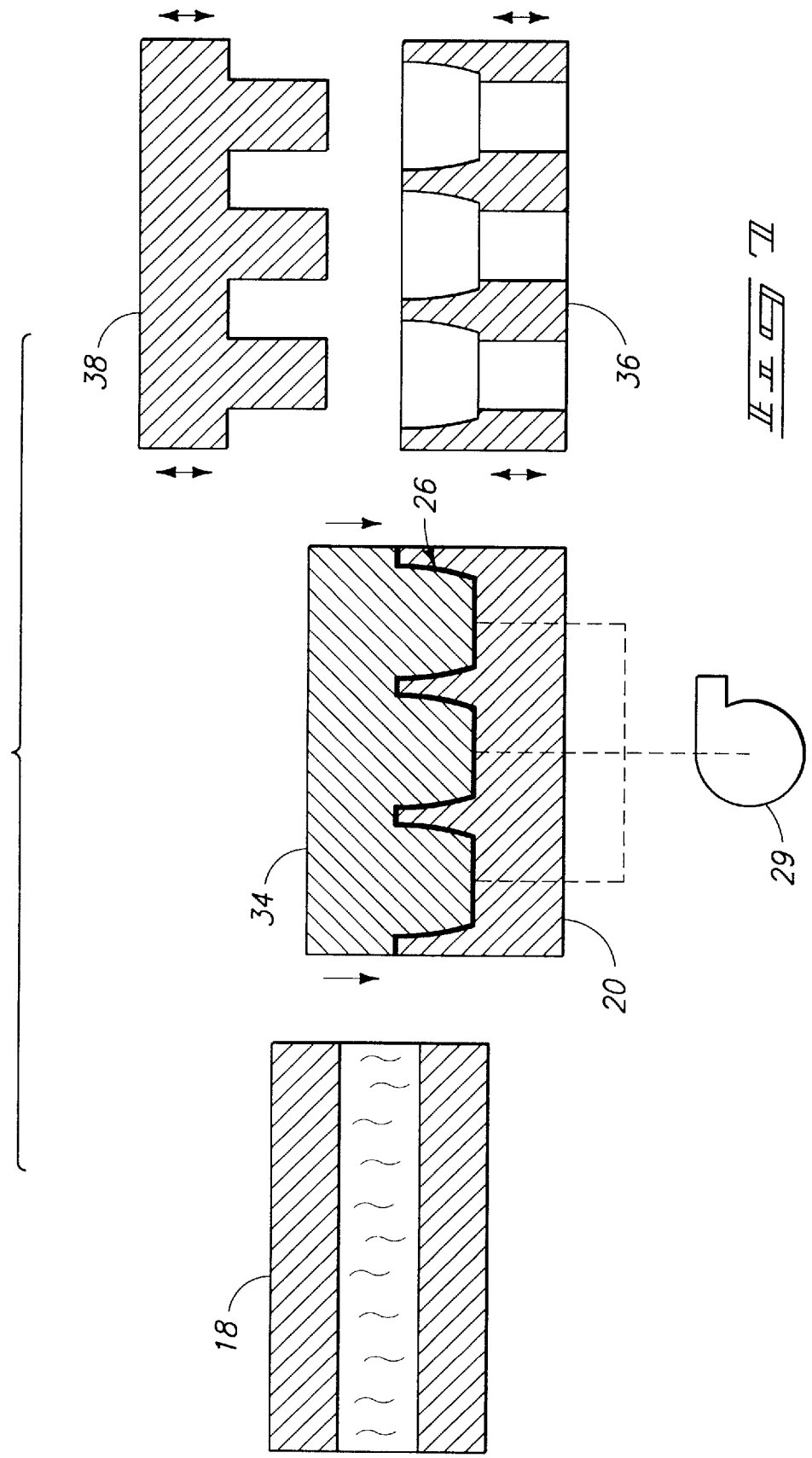
FIG. 11 is a second preferred form of lighting louver wherein the webbing area between louver elements remains and is transparent.
Figure 10:
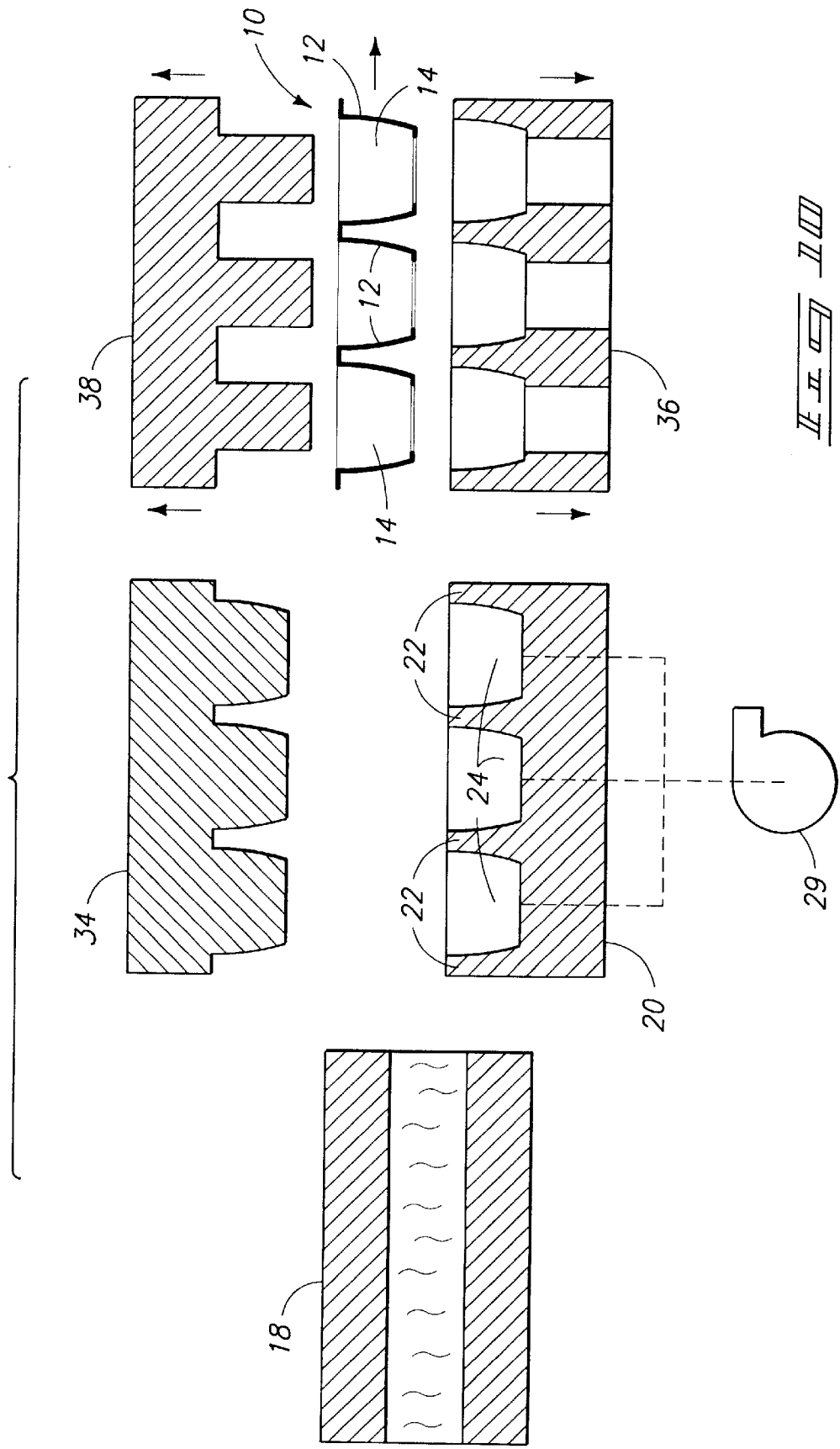
FIG. 10 is a schematic view showing removal of the completed louver from the die stamping apparatus.
Figure 11:
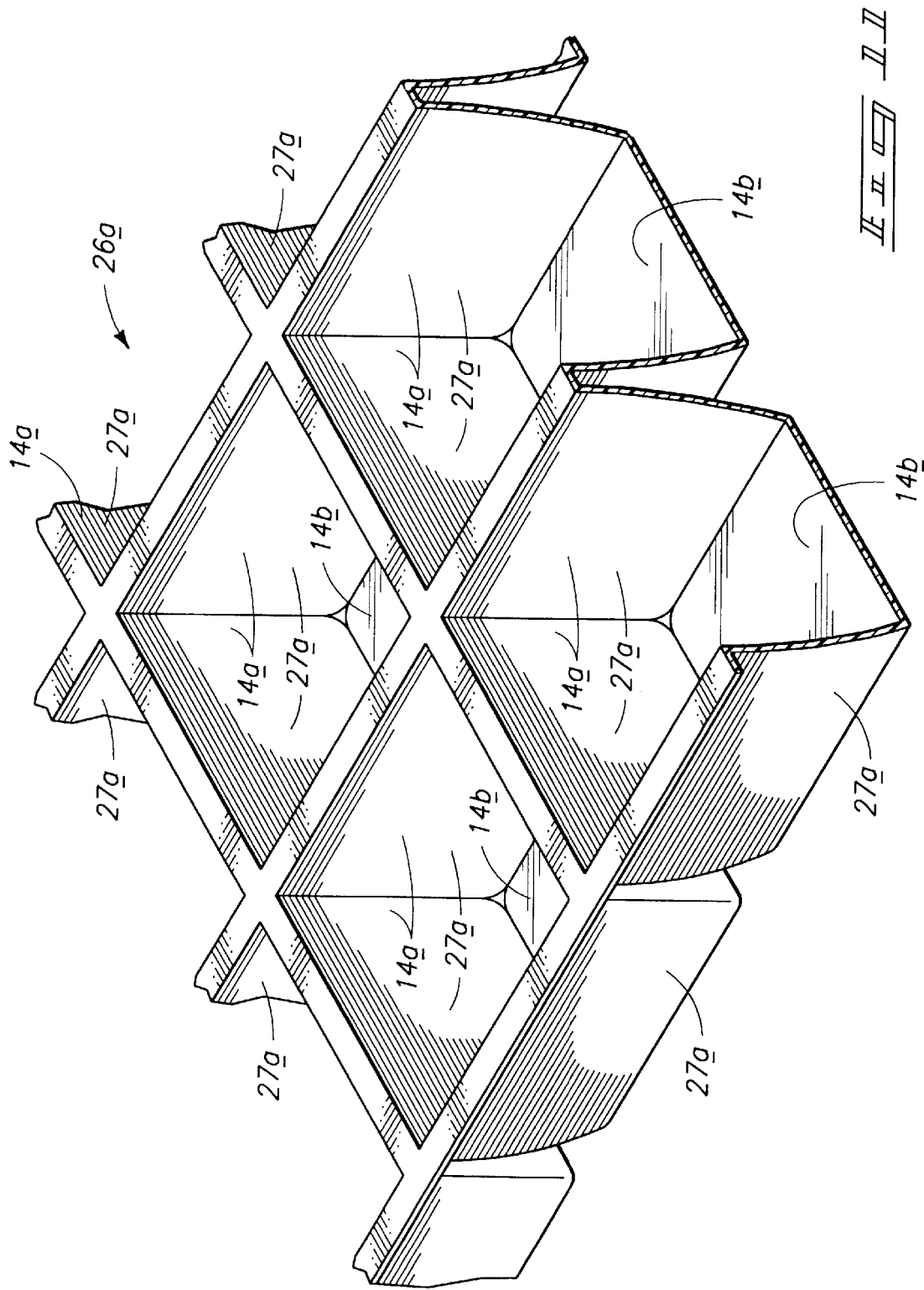

A preferred process is exemplified herein for forming either of two basic forms of lighting louvers. A first lighting louver is generally shown at 10 (FIG. 2), and another preferred form is designated at 10a (FIG. 11). Both forms include a plurality of formed light reflective louver members 12, 12a. The louvers 10, 10a are configured similarly to existing forms of louvers in which shaped forms of aluminum or other reflective metal is progressively formed using die stamping, forming presses, and swaging machinery. The process disclosed herein eliminates many of the costly metal forming operations, thereby enabling production of quality lighting louvers at a fraction of the cost previously experienced in metal louver construction.

Figure 5:
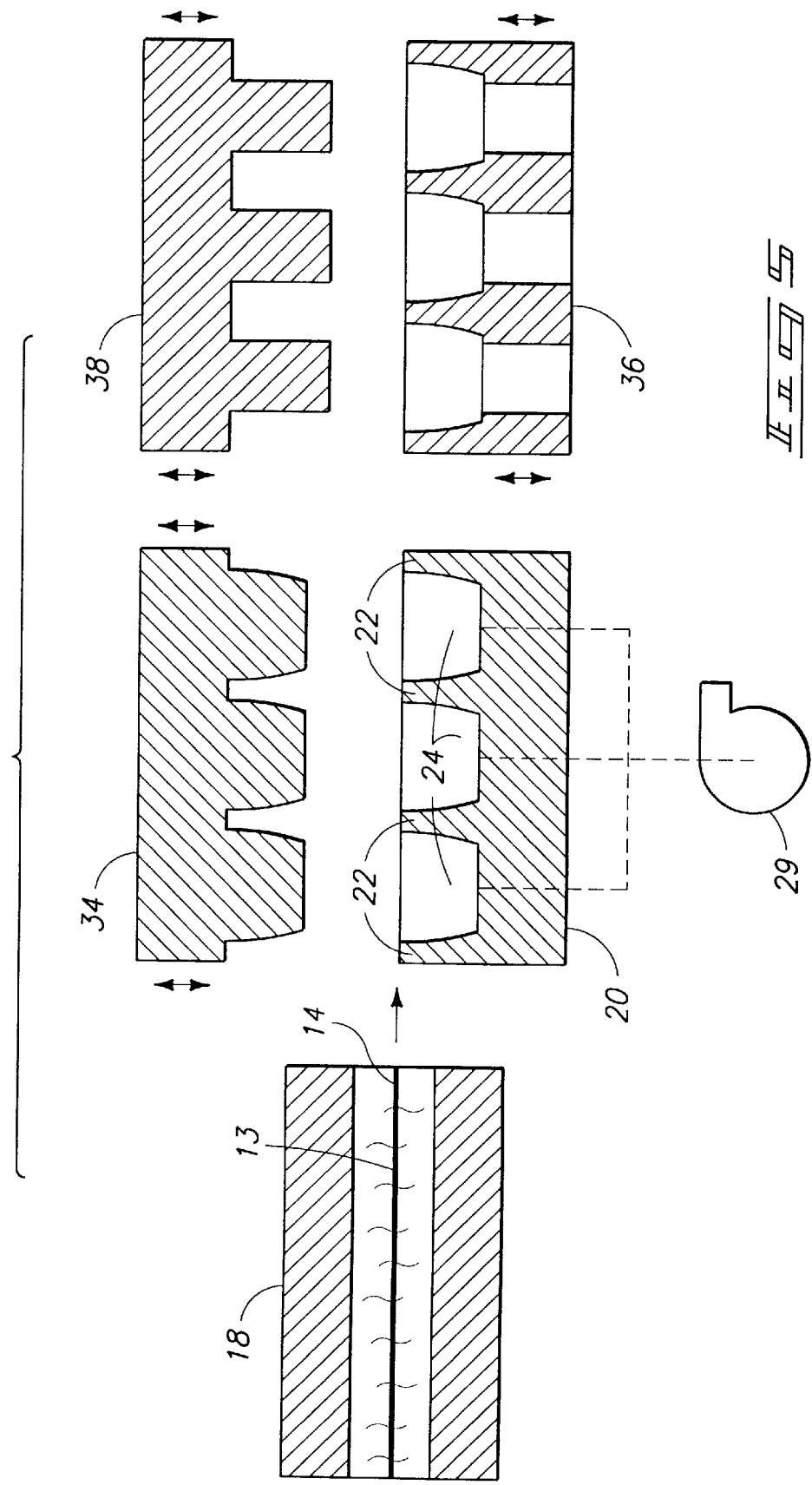
FIG. 5 is a schematic view showing a sheet heating step in the presently preferred process.

The first step in the preferred process includes providing a sheet 13 (FIG. 5) of thermoformable material, most preferably an appropriate thermoformable plastic. It is also preferred that the selected plastic be opaque with a light reflective surface 14 provided on at least one of the areal sides thereof. The thickness dimension and size of the sheet 13 is selected according to the size of the louver to be produced.

In the alternate form shown in FIGS. 11 and 12, a sheet 13a is provided in which areas are coated or otherwise provided with reflective surfaces 14a. The sheet is also produced with light transmissive areas 14b that are preferably transparent. The sheet 13a is provided in this manner to enable formation of a louver 10a (FIG. 11) in which louver segments include reflective surfaces and web areas 28a spanning the louver segments are transparent to permit transmission of light.

In FIG. 12, the reflective surfaces 14a are shown indicating a dimensional allowance to enable the sheet to be thermoformed in such a manner that the reflective surfaces 14a will form into the louver member configurations with the preferred transmisssive areas 14b spanning the areas between finished louver members as shown in FIG. 11. The dimensional allowances may be determined using known engineering practices.

As a further alternative, the sheet may be transparent. The transparent sheet may be coated with a reflective layer by painting, vacuum metalizing, or by other known coating or plating processes either before or after the thermoforming process. The coating may be applied to the sheet, or to the finished louver blank, or at any appropriate time during the forming process.

In the preferred process, the selected sheet 13 or 13a is heated to a pliable state. This step may be accomplished using a conventional oven diagrammatically shown in FIG. 5 at 18. The temperature is regulated such that the sheet is heated to a point where it becomes soft and pliable.

A forming mandrel 20 is provided to accomplish the next step. The forming mandrel includes a series of mandrel partitions 22 that are arranged with spaces 24 between the partitions 22. The partitions 22 are preferably formed, using common machining practices, as an intersecting set of parabolic reflectors, but could be otherwise formed according to the desired configuration of the louver. As an alternative, the mandrel partitions may be produced in a configuration inverted from those shown, including shaped slots or grooves (not shown) in the mandrel into which the sheet material would be drawn or forced in the forming steps discussed below.

Figure 6:
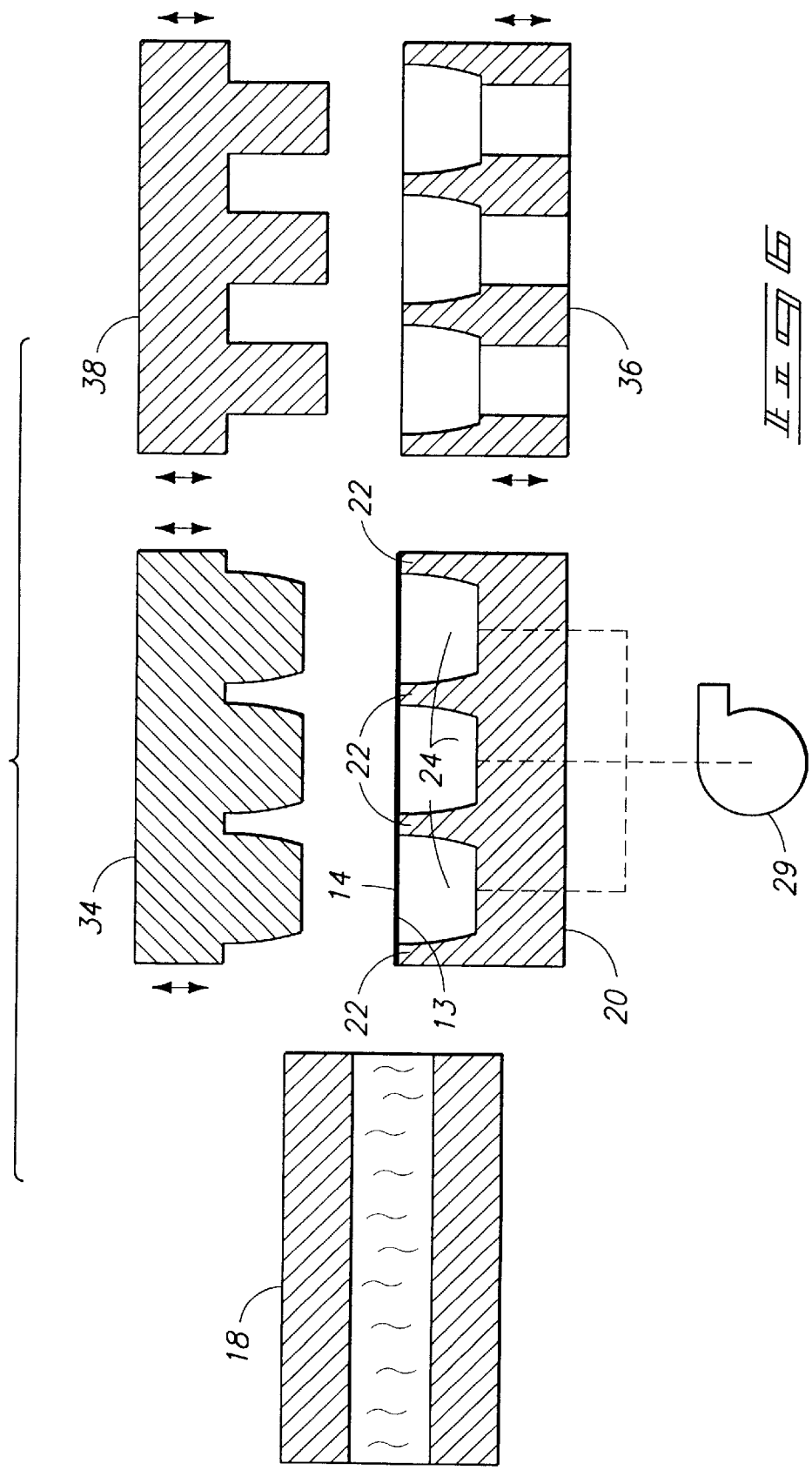
FIG. 6 is a schematic view showing a positioning step wherein the heated sheet is positioned over a forming mandrel.

As a further step in the present process, the heated sheet 13 or 13a is positioned over the forming mandrel as shown in FIG. 6. Appropriate registration pins 19 or other registration assisting provisions may be used here to assure the desired orientation of the sheet relative to the forming mandrel. Such alignment is especially beneficial with the sheet form 13a since it is desirable that the reflective areas 14a be properly aligned with the partitions 22.

Next, the heated sheet 13 or 13a is forced onto the forming mandrel 20 to form the heated sheet over the mandrel partitions 22. The sheet is thus formed to the mandrel 20, which shapes the pliable sheet into a formed louver blank 26 or 26a including formed parabolic louver segments 27 or 27a that conform to the parabolic mandrel partitions 22. Webbing segments 28 or 28a conform to the spaces between the partitions on the forming mandrel.

Figure 1:
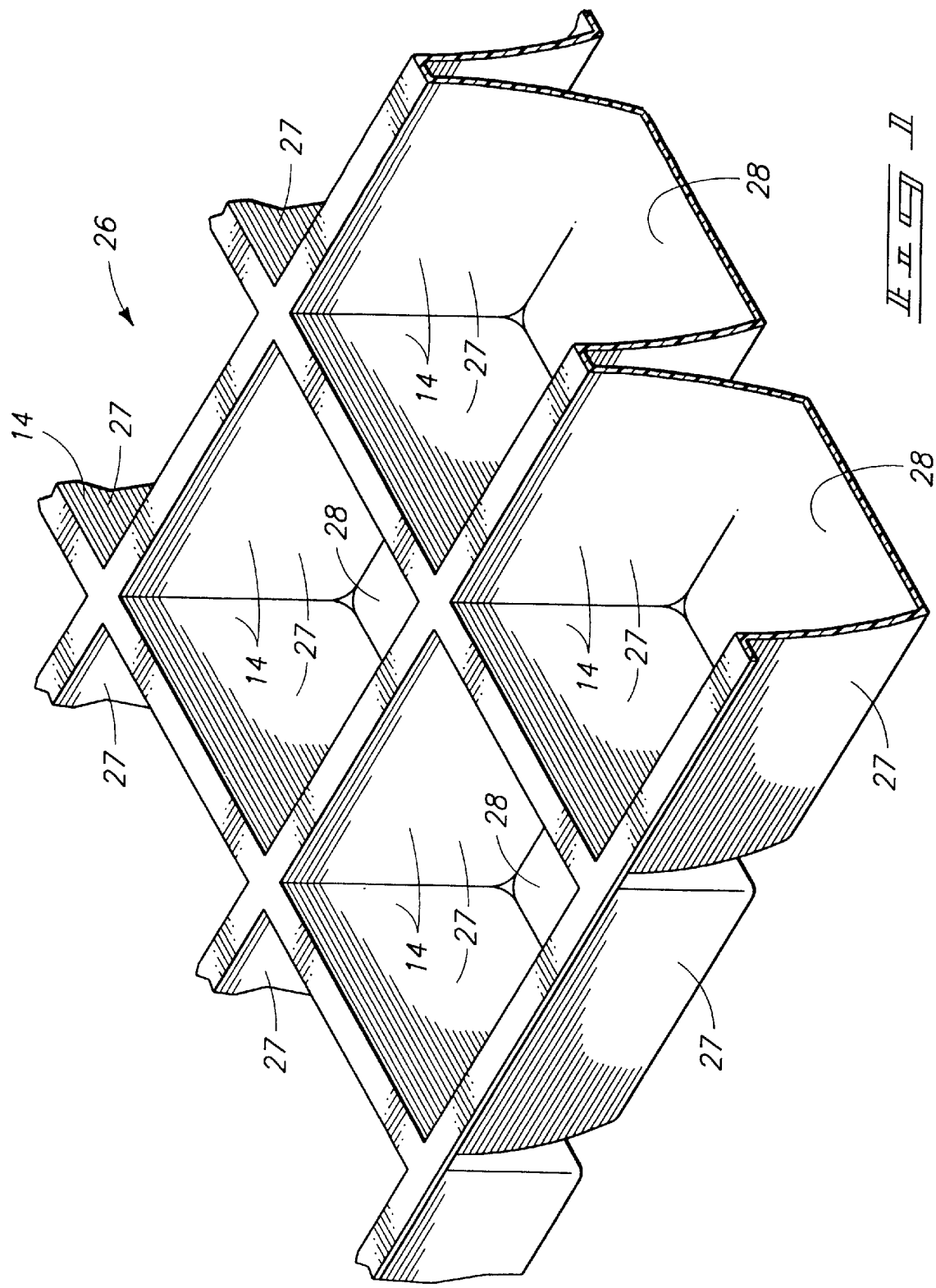
FIG. 1 is a fragmented perspective view of a partially completed lighting louver produced blank formed by the presently preferred process.

The above steps are accomplished in the preferred process by using a vacuum pump 29 of known form to pull the sheet 13 or 13a against the mandrel 20. The pliable sheet 13 or 13a will conform to the mandrel surfaces as the air is withdrawn from the space between the mandrel and sheet. A louver blank 26 or 26a is thus produced, that includes the louver segments 27, or 27a and webbing segments 28 or 28a joining the louver segments. The particular examples shown in FIGS. 1 and 11 include louver segments 27, 27a that intersect at right angles; however, other shapes and patterns may be used.

It is pointed out at this time that the mandrel 20 may be used alone, with vacuum pressure being used to draw the heated sheet into the mandrel form. In another preferred example, a plug 34 formed in a complementary positive shape (the inverse shape of the mandrel 20) is provided for insertion into the mandrel 20, to assist the formation process and to assure an even wall thickness of the finished louver blank 26 or 26a. The plug 34 is pressed onto the mandrel as the vacuum pressure is applied, assuring close conformance of the sheet material to the mandrel shapes.

It is also pointed out that vacuum pressure, while desired for drawing the heated sheet onto the mandrel, may not be used and a positive fluid (most desirably air) pressure may be applied instead to the opposite side of the sheet to obtain similar results. It is also possible to use a combination of positive pressure on one side of the sheet, and vacuum pressure on the mandrel side of the sheet to accomplish the forming step. Either or both forms of positive and negative pressure application may also be used with the plug 34.

After the louver blank 26 has cooled and hardened sufficiently to maintain a self-supporting state, the next step is performed. This step will vary with the nature of the louver. If the first form of louver 10 is being formed, steps described below are taken to remove the webbing segments 28. If the second louver 10a is being formed, the cooled blank is simply removed from the form in a substantially finished state ready for mounting in a louver frame.

The process continues, in production of the first louver form 10, with the further step of producing light transmissive areas between the louver segments. This step is preferably accomplished in the first preferred embodiment by a step in which the webbing segments 28 are removed from the blank 26. It is preferred that the blank 26 be removed from the mandrel prior to the step of removing the webbing segments 28, but in alternate forms it is conceivable that the mandrel and plug could be provided with cutting components to accomplish this step at substantially the same time that the louver blank is formed.

The step of removing the webbing segments 28 is preferably accomplished by a punch and die arrangement as graphically shown in FIG. 9. Here, a die 36 is provided with openings similar to the desired openings to be formed in the louver. A punch 38 is provided with punch members, each having a shape similar to and slidably receivable within the die openings. The louver blank 26 is positioned between the die and punch members in proper registration with the web segments 28 aligned with the punch and die members. Then the punch and die members are moved together, shearing the web segments from the formed sheet and leaving prescribed openings in the now substantially finished louver.

It is conceivable that other forms of cutting apparatus could be used to remove the web segments, leaving the intersecting louver members 12. For example, an alternate means for removing the segments 28 might involve use of a milling cutter or other appropriate cutting device for removing the webbing segments.

Once the webs are removed, the first preferred louver is complete, leaving the louver members 12 and open light transmissive passages. The process is now complete and the finished complete louver 10 may now be mounted in an appropriate frame for installation. This step may be similar to steps presently taken for mounting conventional metal louvers in frames.

The step of producing light transmissive areas between the louver segments in the second preferred form is accomplished by initially producing the sheet 13a with light transmissive areas 14b. There is no need to remove the webbing segments 28a since the transmissive areas 14b will function to transmit light.

Steps taken to mount the finished louver 10a will be similar to those taken to mount louver 10.

It is anticipated that either form of louver 10 or 10a will function comparably to conventional stamped and swaged metal louvers, delivering similar performance at minimal cost for production.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A process for forming a lighting louver including a plurality of louver members, comprising the steps of:

provided a sheet of thermoformable material having opposed sheet surfaces;

heating the sheet to a pliable state;

providing a forming mandrel having a series of mandrel partitions arranged with spaces between the partitions;

positioning the heated sheet over the forming mandrel; and applying pressure against both surfaces of the heated sheet and thereby forcing the heated sheet onto the forming mandrel to form the heated sheet over the mandrel partitions and thereby produce a formed louver blank including formed louver segments that conform to the mandrel partitions and webbing segments that conform to the spaces between the partitions on the forming mandrel.

2. The process of claim 1 comprising the further step of removing the webbing segments from the louver blank.

3. The process of claim 1 wherein the step of providing a thermoformable sheet is accomplished by providing a sheet of thermoformable material including light transmissive areas.

4. The process of claim 1 wherein the step of forcing the heated sheet of thermoformable material onto the forming mandrel is accomplished by producing a negative fluid pressure between the forming mandrel and one side of the heated sheet to draw the sheet onto the mandrel and form the sheet into the configuration of the partitions and the spaces between the partitions, and by producing a positive fluid pressure on the remaining side of the heated sheet to press the sheet onto the mandrel.

5. A process for forming a lighting louver including a plurality of interconnected louver members, comprising the steps of:

providing a sheet of thermoformable plastic and having opposed sheet surfaces;

heating the sheet to a pliable state;

providing a forming mandrel having a series of parabolic louver forming mandrel partitions arranged with spaces between the mandrel partitions;

positioning the heated sheet over the forming mandrel with one sheet surface facing the forming mandrel;

applying a pressure against the one sheet surface, and applying a negative pressure against the remaining sheet surface and thereby forcing the heated sheet onto the forming mandrel to form the sheet over the mandrel partitions and forming a louver blank including formed parabolic louver segments that conform to the parabolic mandrel partitions and webbing segments that span the spaces between the parabolic mandrel partitions; and providing light transmissive areas between the formed parabolic louver segments and light reflective surfaces on the parabolic louver segments.

6. The process of claim 5 wherein the step of providing light transmissive areas between the formed parabolic louver segments is accomplished by removing the webbing segments from the louver blank.

7. The process of claim 5 wherein the step of providing light transmissive areas between the formed parabolic louver segments is accomplished by providing the thermoformable sheet with light transmissive areas.

8. The process of claim 5 wherein the step of providing light transmissive openings between the formed parabolic louver segments is accomplished by removing the webbing segments from the louver blank by die stamping.

9. The process of claim 5 wherein the step of providing light reflective surfaces is accomplished by coating the sheet with a light reflective surface.

10. The process of claim 5 wherein the step of providing light reflective surfaces is accomplished by coating the parabolic louver segments with a light reflective surface.

11. The process of claim 5 wherein the sheet is opaque and includes a light reflective surface.

12. A process for forming a lighting louver including a plurality of interconnected louver members, comprising the steps of:

providing a sheet of thermoformable material including opposed sheet surfaces, one of said sheet surfaces having a light reflective surface;

heating the sheet to a pliable state;

providing a forming mandrel having a series of parabolic mandrel partitions arranged with spaces between the mandrel partitions;

positioning the heated sheet over the forming mandrel;

forming the sheet over the parabolic mandrel partitions by pressing one of the sheet surfaces onto the mandrel partitions and by pulling a remaining one of the sheet surfaces into the mandrel partitions, thereby forming a louver blank including formed parabolic louver segments that conform to the parabolic mandrel partitions and webbing segments that conform to the spaces between the parabolic mandrel partitions; and producing light transmissive areas between the formed parabolic louver segments by removing the webbing segments.

* * * * *